United States Patent [19]
Wejke et al.

[11] Patent Number: 5,175,867
[45] Date of Patent: Dec. 29, 1992

[54] NEIGHBOR-ASSISTED HANDOFF IN A CELLULAR COMMUNICATIONS SYSTEM

[75] Inventors: Anna M. Wejke; Claes Andersson, both of Stockholm, Sweden

[73] Assignee: Telefonaktiebolaget L M Ericsson, Stockholm, Sweden

[21] Appl. No.: 670,237

[22] Filed: Mar. 15, 1991

[51] Int. Cl.$^5$ ............................ H04Q 7/00; H04Q 9/00
[52] U.S. Cl. .................................. 455/33.1; 455/33.2; 455/33.4; 455/53.1; 455/54.2; 455/56.1; 455/67.1; 379/60
[58] Field of Search ...................... 455/33.1, 33.2, 33.4, 455/34.2, 49.1, 53.1, 54.1, 54.2, 56.1, 67.1, 67.3; 379/60

[56] References Cited

U.S. PATENT DOCUMENTS

| | | | |
|---|---|---|---|
| 4,435,840 | 3/1984 | Kojima et al. | 455/33.4 |
| 4,527,284 | 7/1985 | Röttger | 455/33.2 |
| 4,669,107 | 5/1987 | Eriksson-Lennartsson | 379/60 |
| 4,670,899 | 6/1987 | Brody et al. | 455/56.1 |
| 4,670,905 | 6/1987 | Sandvos et al. | 455/33.2 |
| 4,718,081 | 1/1988 | Brenig | 379/60 |
| 4,726,050 | 2/1988 | Menich et al. | 379/60 |
| 4,737,978 | 4/1988 | Burke et al. | 455/33.2 |
| 4,811,380 | 3/1989 | Spear | 379/60 |
| 5,042,082 | 8/1991 | Dahlin | 455/33 |
| 5,117,502 | 5/1992 | Onoda et al. | 455/33.1 |

Primary Examiner—Reinhard J. Eisenzopf
Assistant Examiner—Timothy H. Keough
Attorney, Agent, or Firm—Burns, Doane, Swecker & Mathis

[57] ABSTRACT

A handoff system where handoff requests are initiated not only by a home or serving base station, but also by neighboring base stations. As in conventional handoff, a serving base station may initiate a handoff request when the signal strength of one of its mobile stations falls below a predetermined threshold. In addition, neighboring base stations monitor the signal strength of neighboring mobile stations and request that a neighboring mobile station be handed off when that signal strength reaches a predetermined level. Thus, a handoff request may come from the serving base station because of a poor call connection or from a neighboring base station because of a possible strong call connection.

23 Claims, 10 Drawing Sheets

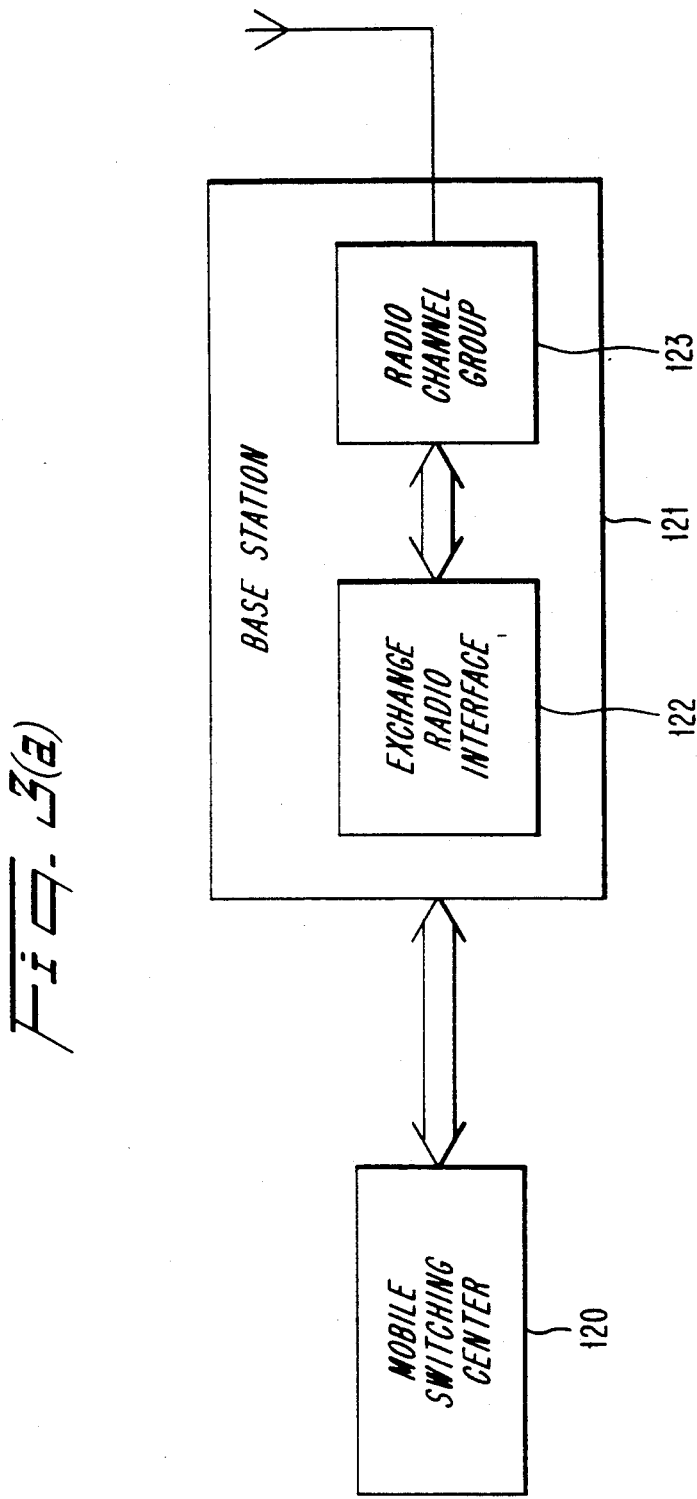

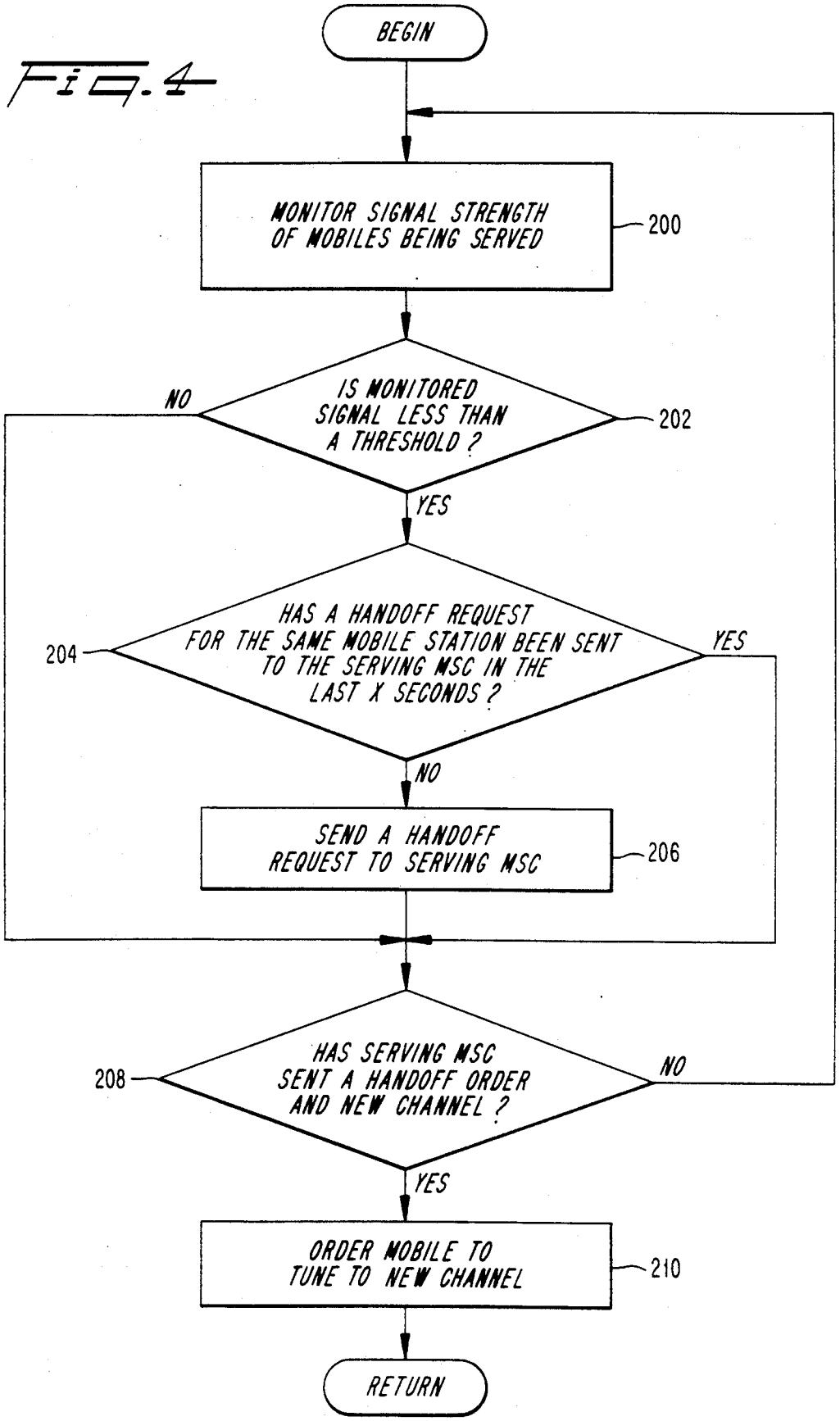

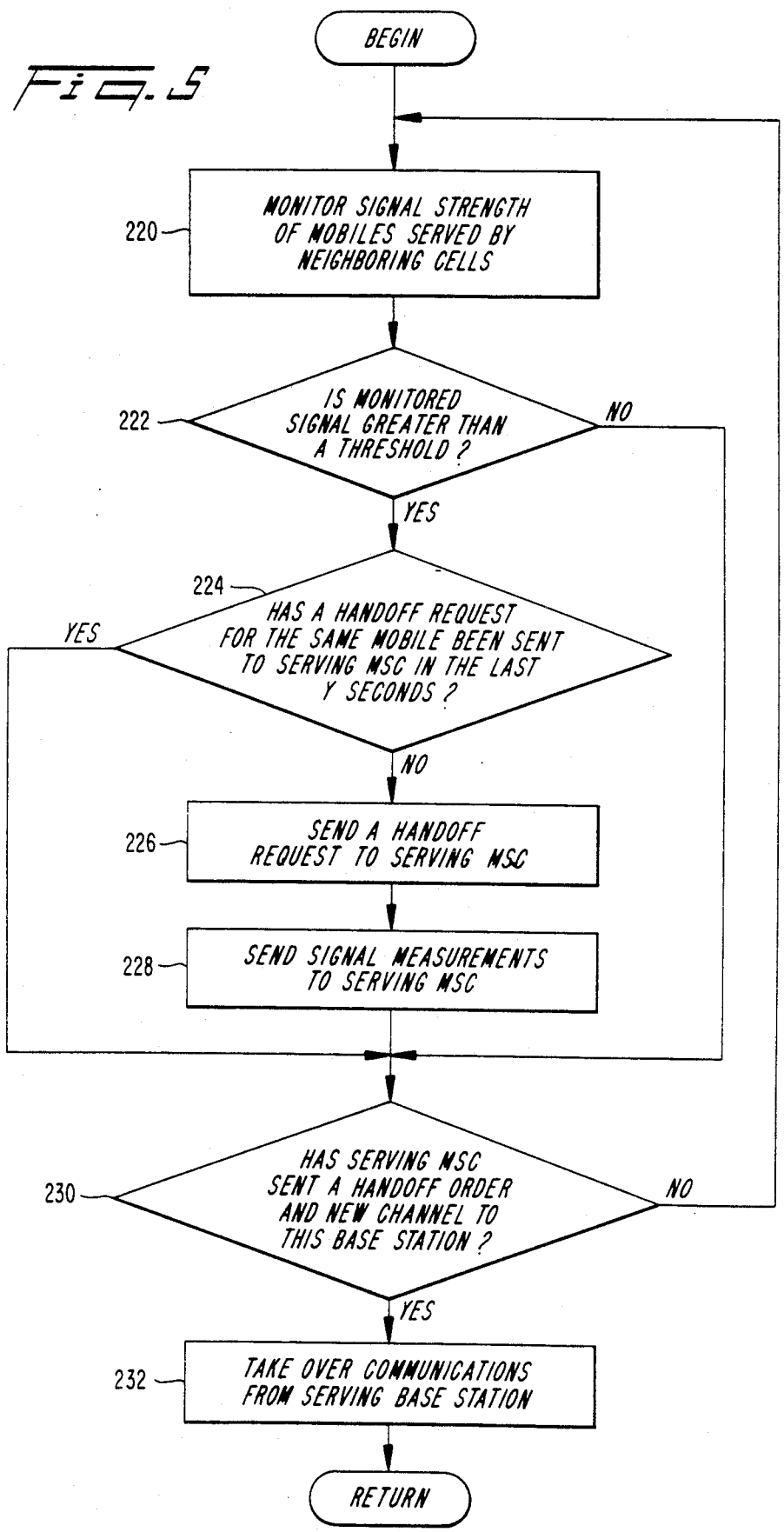

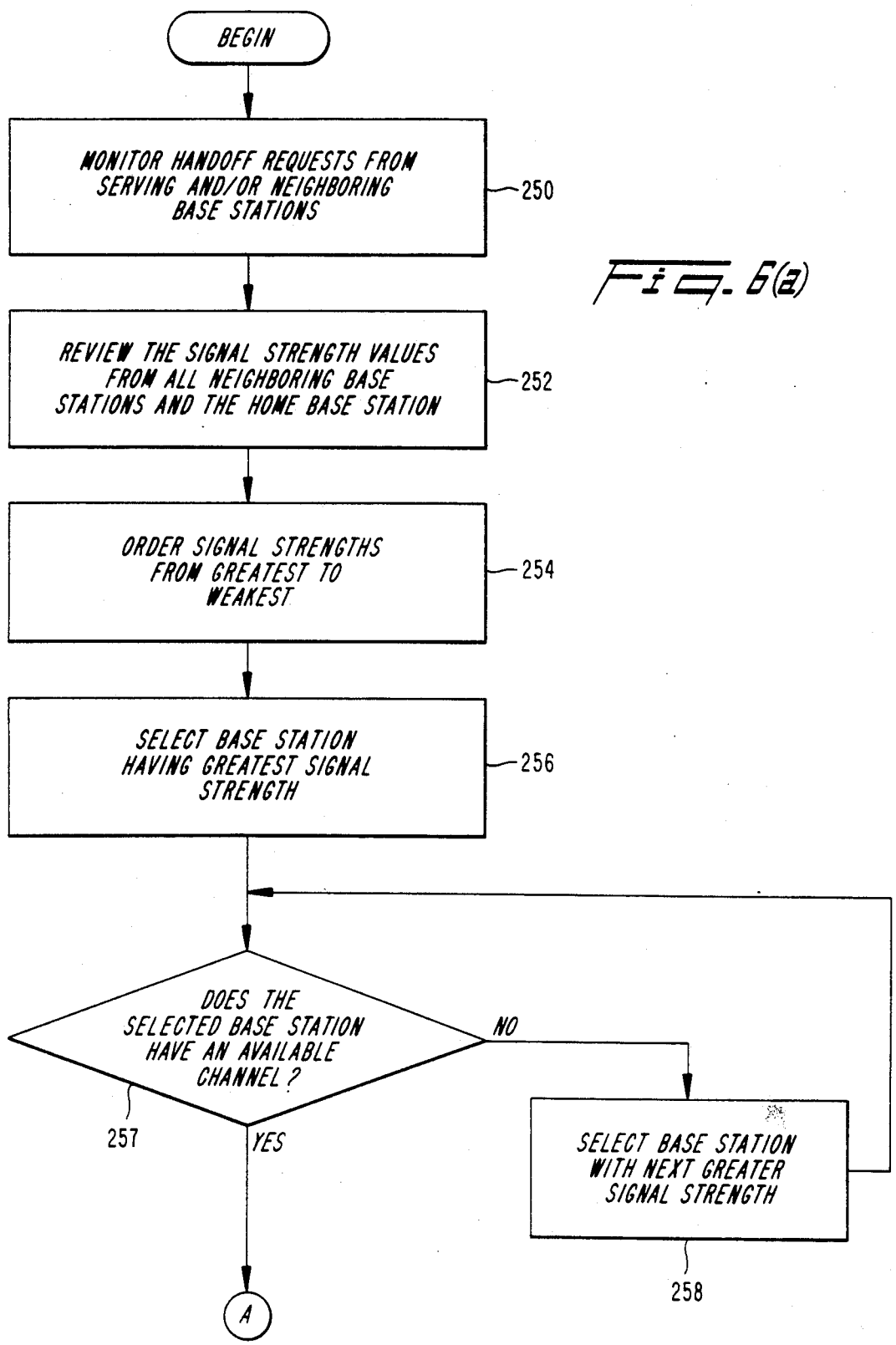

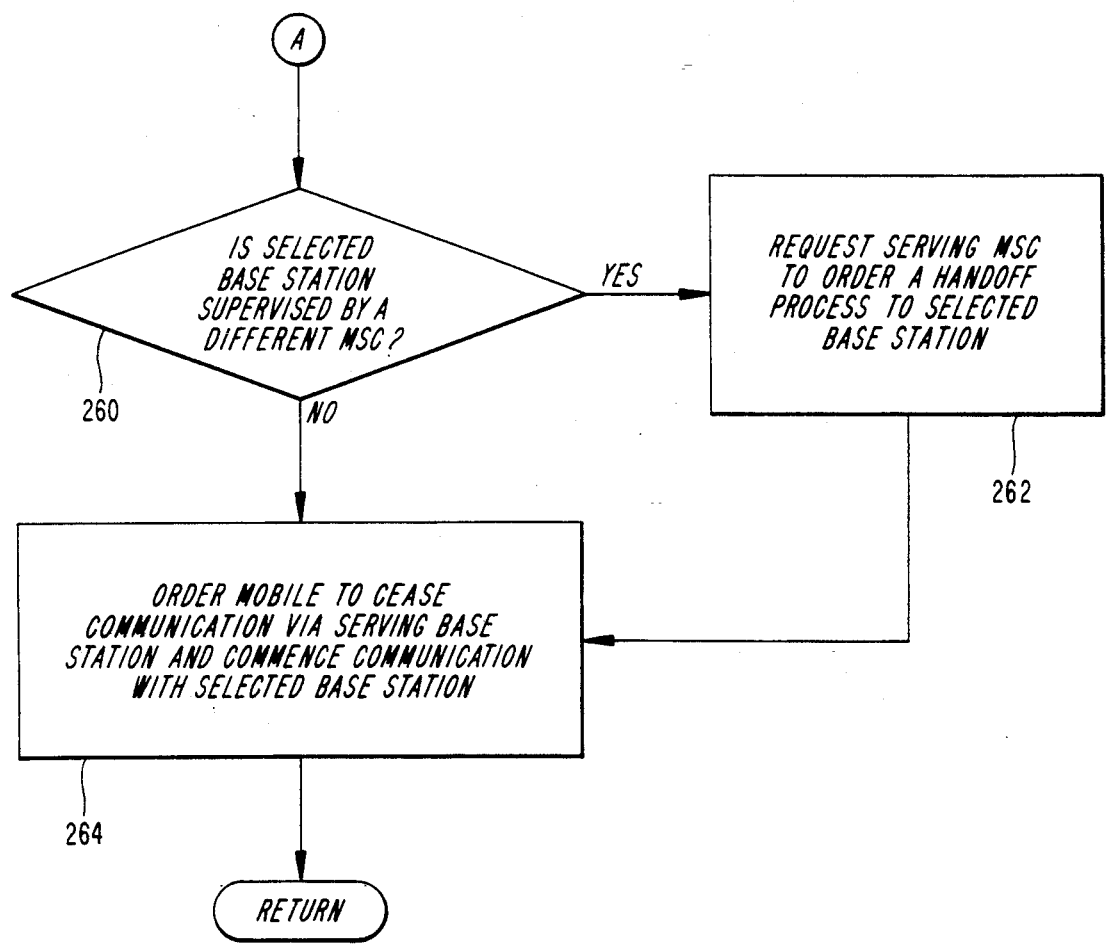

NEIGHBOR-ASSISTED HANDOFF IN A CELLULAR COMMUNICATIONS SYSTEM

FIELD OF THE INVENTION

The present invention relates to cellular mobile radio systems. More particularly, the present invention is directed to an improved method for handing off call connections between neighboring cells.

BACKGROUND OF THE INVENTION

Conventional cellular mobile radio telephone systems include a land system and many mobile stations. The land system consists of at least one mobile switching center and several radio base stations which are distributed over a geographical area. Each radio base station serves a cell, i.e. a part of the geographical area, by sending and receiving information to and from mobile stations over radio channels. The mobile switching center, connected on one side to the public switching telephone network and on the other to the base stations, performs most of the control functions required for calls to and from the mobile stations in the geographical area. Because the cells are relatively small, mobile stations often travel between a number of different cells. The process of switching the established call from a home base station in one cell to a target base station in another cell is known as handoff.

In existing analog Frequency Division Multiple Access (FDMA) cellular systems, a base station determines the need for a handoff of mobile stations it is handling based on periodic measurements of the signal strength and signal quality of the uplink voice channel signals received from each mobile station engaged in a call. If the measured signal strength or signal quality is below a predetermined level, that home base station sends a handoff request to the mobile switching center. The mobile switching center queries neighboring base stations for reports of the previously measured signal strength of signals on the voice channel currently being used by the mobile station. The mobile switching center selects the neighbor base station reporting the strongest signal, provided that signal is above a threshold, and transmits appropriate commands to that target base station and to the mobile station via the home base station to tune to a specified new voice channel.

In dual-mode systems, as specified in the EIA/TIA IS-54 standard, handoff may also be implemented using Mobile-Assisted Handoff (MAHO) Using this procedure, a mobile station may be ordered by the land system to measure and report signal strength and other parameters of the digital radio channel emitted by the home base station, and the neighbor base stations This enables handoff requests by a home base station to be based not only on the signal strength and other parameters of the uplink signal received from the mobile station, but also on the down link signal parameters detected by the mobile station of the home and neighbor base stations. However, when performing a handoff from an analog to a digital channel, MAHO cannot be used because the mobile station cannot report signal strength or other signal parameter measurements over an analog channel.

In purely digital cellular systems, mobile-assisted handoff may always be used. For a more detailed U.S. patent application Ser. No. 371,126, filed Jun. 26, 1989.

There are a number of disadvantages associated with the presently known handoff methods described above. For example, if an analog voice channel is used in a call, a mobile station may cross several cell boundaries before its signal strength becomes too weak. Conventional handoff (without MAHO) does not account for the possibility that a geographically closer base station would provide a stronger, higher quality signal connection with that mobile station. Similarly, in cellular systems having a large umbrella cell that includes a number of small microcells, traditional handoff (without MAHO) requires a permanent and inflexible request procedure to handoff calls from the umbrella cell to the microcells because the signal strength of a mobile station travelling in the umbrella cell may never fall below the threshold under which handoff is initiated. Such a permanent handoff request procedure results in excessive signal processing.

Disadvantages are also associated with handoff in digital systems. In a purely digital system using Mobile-Assisted Handoff (MAHO), if a mobile station is moved around a street corner so that its signals cannot be received by its home base station, no more measurements can be reported by that mobile station. After a time period during which it is hoped to reestablish contact with the mobile station expires, handoff becomes uncertain because the signal measurements are several seconds old. Regarding how a handoff may be improved in this situation, reference is made to U.S. patent application Ser. No. 604,522, filed Oct. 25, 1990, which may be used together with the present invention and is incorporated herein by reference.

SUMMARY OF THE INVENTION

In order to improve the flexibility of conventional handoff systems and to improve cell load balancing, the present invention is directed to a handoff system where handoff requests may be initiated not only by a home or serving base station, but also by neighboring base stations. As in conventional handoff, a serving base station may initiate a handoff request when the signal strength or quality of one of its mobile stations falls below a predetermined threshold. In addition, neighboring base stations monitor the signal strength of neighboring mobile stations and initiate a handoff request when that signal strength reaches a predetermined level. In other words, a handoff request may come from the home base station because of a poor call connection or from a neighboring base station because of a possible strong signal connection. The mobile switching center determines in either handoff situation whether a handoff will occur to improve the strength or quality of the call connection and/or to improve load balancing among calls in high traffic density areas.

The signal strength level above which a handoff is requested by a neighboring base station depends on the particular threshold of that neighboring base station requesting a handoff relative to that home base station. By changing the threshold levels among different base stations, the size and shape of cells may be adapted dynamically. While the thresholds for making a handoff decision may be based on differences in signal strength, the present invention prescribes thresholds for requesting a handoff based on absolute signal strengths or path loss. Path loss is the difference in decibels between the transmitted and the received signal strengths of a signal. The neighboring base station requesting a handoff may assume the mobile station is transmitting at the maximum power level allowed in the mobile station's present cell if the transmitting power level is not available.

Furthermore, the present invention is directed to providing a handoff procedure of calls using digital channels and mobile-assisted handoff (MAHO) where handoffs may be performed safely despite disruptions to connections with the home base station.

BRIEF DESCRIPTION OF THE DRAWINGS

The present invention will now be described in more detail with reference to preferred embodiments of the invention, given only by way of example, and illustrated in the accompanying drawings, in which:

FIG. 4 is a flow chart illustrating a routine performed by a serving base station according to the present invention;

FIG. 5 is a flow chart illustrating a routine performed by a neighboring base station;

FIGS. 6(a)–6(b) are flow charts illustrating the main routine performed by the mobile switching center according to the present invention;

DETAILED DESCRIPTION OF THE PREFERRED EMBODIMENTS

Before describing the details of the present invention, an example of the construction of a cellular mobile radio system in which the present invention can be used will be described.

Figure 1:
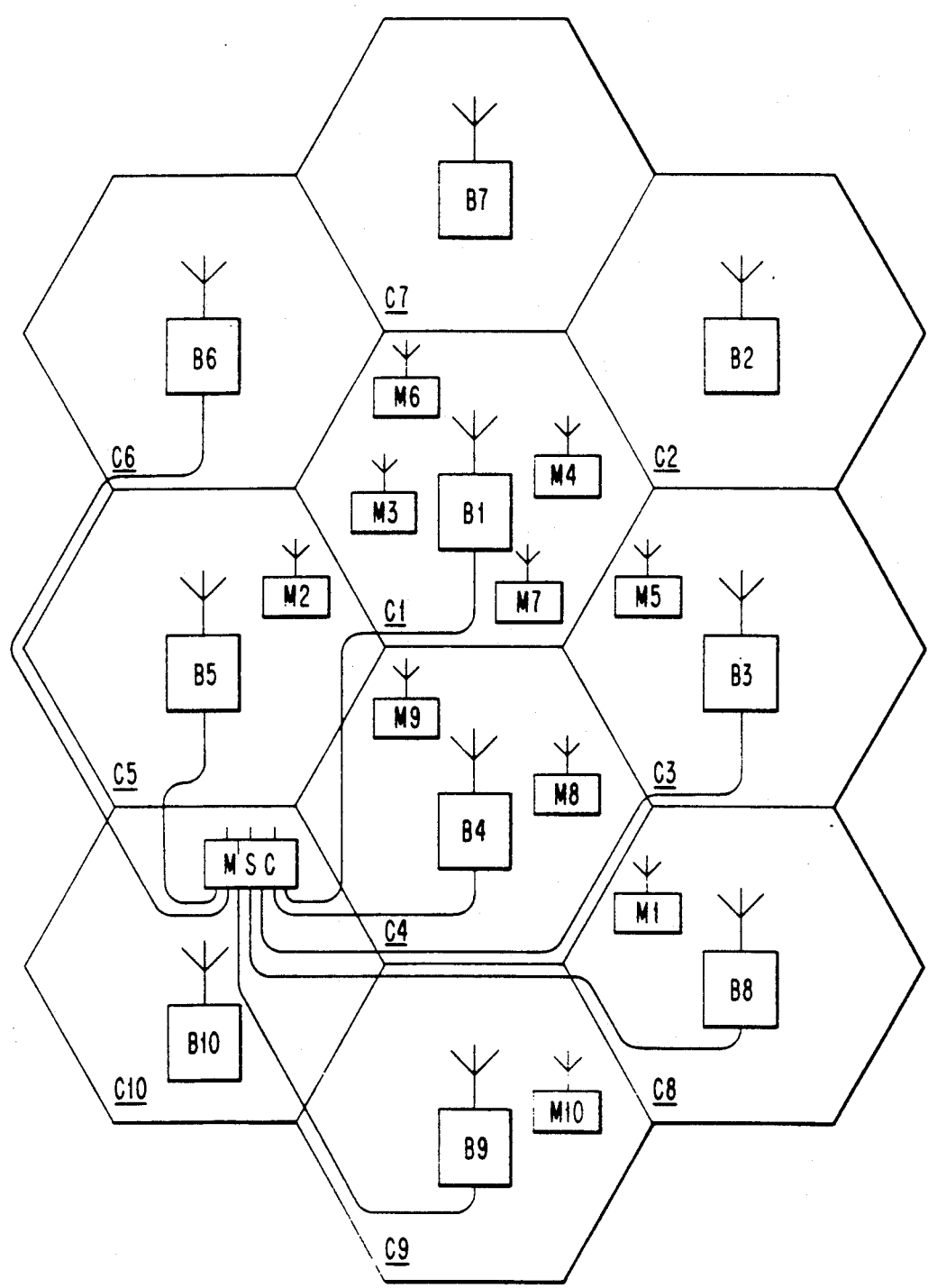
FIG. 1 is a schematic diagram illustrating an example of a cellular mobile radio system, illustrating the relationship of the system's cells, a mobile switching center, base stations and mobile stations.

FIG. 1 is a schematic diagram illustrating ten cells, C1 to C10, in a cellular mobile radio telephone system. Normally the method according to the present invention would be implemented in a cellular mobile radio system comprising many more cells than ten. For purposes of this discussion, the system depicted herein is considered to be an isolated portion of a larger system which has been fragmented.

For each cell C1 to C10, there is a respective base station B1 to B10. FIG. 1 illustrates base stations situated in the vicinity of cell centers and having omni-directional antennas. The base stations of adjacent cells may however be collocated in the vicinity of cell borders and have directional antennas.

FIG. 1 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center. The mobile switching center MSC illustrated in FIG. 1 is connected to all ten illustrated base stations by cables. The mobile switching center is connected by cables also to a fixed public switching telephone network or similar fixed network with ISDN facilities. All cables from the mobile switching center to base stations and cables to the fixed network are not illustrated. Further, other media may be used instead of cables for base to mobile switching center communications, e.g., fixed radio links.

The cellular mobile radio system illustrated in FIG. 1 includes a plurality of radio channels for communication. The system is designed both for analog information, e.g., speech, digitized analog information, e.g., digitized speech, and pure digital information, e.g., pure digital data. Thus a connection may be a call where two people talk to each other, but may also be a data communication channel where computers exchange data.

Each cellular system is assigned a particular frequency band (wire line or non-wire line) over which it can operate. A set of communication channels is allocated to each cell. For example, between 10 and 30 different voice channels and 1 control channel may be allocated to any given cell. Different sets of communication channels must always be allocated to neighboring cells since, in order to maintain full radio coverage, cells overlap each other. Using the same channels in adjacent cells would cause co-channel interference in these overlapping areas.

Figure 2:
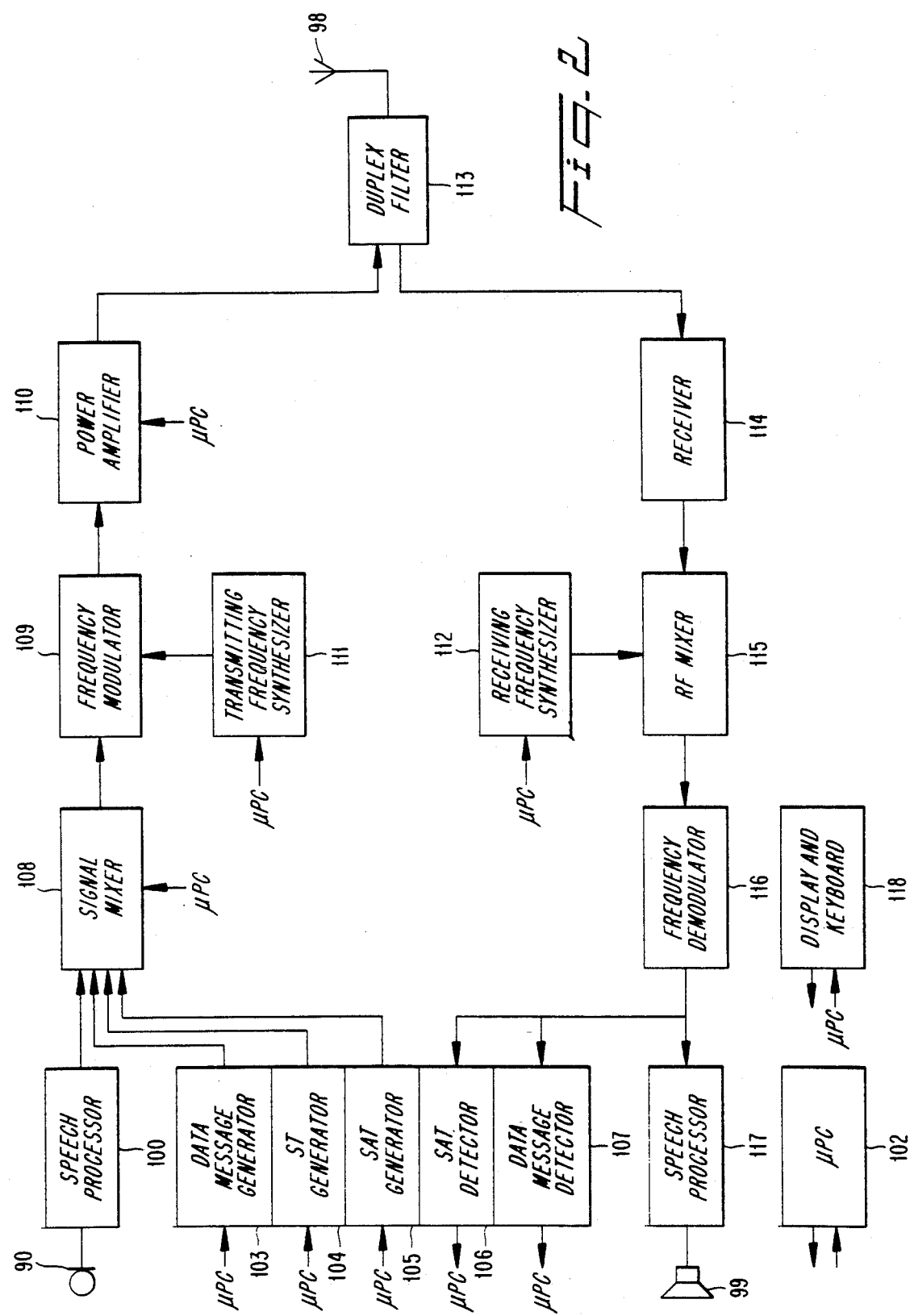
FIG. 2 is a block diagram illustrating an analog FDMA mobile station in a cellular mobile radio system according to FIG. 1.

An analog mobile station operating using frequency division multiple access (FDMA) will now be described in relation to FIG. 2. While the present invention is described in conjunction with analog mobile stations using FDMA, it will be appreciated by those skilled in the art that the present invention may also be applied to dual-mode and digital mobile stations operating with other access procedures. Many of the individual hardware components that make up the mobile station are controlled by or send data signals to a microprocessor control unit 102. A subscriber may communicate with the microprocessor control unit 102 by way of a keyboard and display unit 118. An analog signal generated by a human voice is detected on the microphone 90 and connected to a speech processor 100. The speech processor 100 implements a number of processing stages designed to frequency modulate the carrier signal based on the human voice signals. These processing stages include signal compression, pre-emphasis, deviation limit filtering, and post-deviation limit filtering. As these signal processing stages are well known in the cellular telephone art, no further description of these stages is necessary. A data message generator 103 receives digital data messages from the microprocessor controller 102 in conjunction with signalling between the mobile station and the base station. These messages are transmitted either on the reverse control channel or the reverse voice channel. Content data words having 28 or 36 bits generated by the message generator 103 are coded with a Bose-Chandhuri-Hocgenghem code (BCH) to facilitate error protection and correction. This coding, including parity, is used to correct single-bit errors in the data stream. In addition, the error pattern of two or more errors will be detected. The error-correcting code adds 12 bits to the 28 or 36 bit data word, thus increasing the word length to 40 or 48 bits.

Each analog control channel message begins with a bit-sync sequence, a word-sync sequence, and a coded digital color code (CDCC). The CDCC is used to assure that the proper control channel is decoded. Similar to the control channel messages, the voice channel messages are also provided with a bit-sync sequence and a word-sync sequence.

The signalling tone (ST) generator 104 is used for signalling from the mobile station to the base station, e.g., during call set up and handoff. Under the control of the microprocessor controller 102, the ST is sent as a tone on the reverse voice channel (RVC). The supervisory audio tone (SAT) generator 105 and SAT detector 106 are used to ensure that the correct voice channel is being detected and used. The SAT is transmitted continuously from the base station over the forward voice channel, detected by the SAT detector 106 in the mobile station, and looped back from the SAT generator 105 in the mobile station to the base station over the reverse voice channel. If the expected SAT is detected in the SAT detector 106, the transmitted voice channel carrier will be modulated with that SAT. If the SAT detected does not coincide with the SAT assigned to the appropriate voice channel, the received information is ignored and the receiver is muted. Coded data messages, as opposed to voice messages, are detected by a data message detector 107. Received coded data messages are decoded according to the corresponding BCH code.

Output signals generated by the speech processor 100, the data message generator 103, the ST generator 104, and the SAT generator 105 are received by an audio signal mixer 108. The audio signal mixer 108 filters and combines the received signals in order to limit the carrier bandwidth and form a common signal. During speech transmission, the voice signal from the speech processor 100 is modulated by the SAT. During transmission of data messages from the data message generator 103, transmission of the SAT signal is suspended. However, when the ST signal is transmitted, the SAT signal must also be transmitted. The information signal generated by the audio mixer 108 containing either voice or data message information is used to frequency modulate a carrier signal generated by a transmitting frequency synthesizer 111 in a frequency modulator 109. By mixing the modulating signal from the signal mixer 108 with the carrier output signal from the transmitting frequency synthesizer 111 in the RF modulator 109, the transmitted frequency is generated in accordance with the transmitting channel selected by the microprocessor controller 102. It will be appreciated that in analog cellular communications using FDMA, each communications channel corresponds to a unique frequency in the cell uplink from mobile station to base station and an associated unique frequency downlink from base station to mobile station. The output signal from the frequency modulator 109 is amplified in a power amplifier 110, filtered in a duplex filter 112 to prevent the transmitted radio signals from interfering with the received radio signals, and transmitted over an antenna 98.

A radio signal received from a base station over the antenna 98 is filtered in the duplex filter 112 and received in a receiver 114 for further filtering and amplification. Although not shown, a diversity combiner may be used in conjunction with two receiving antennas to mix two received signals together into one common signal to decrease the consequences of multipath fading. The output signal from the receiver 114 is mixed in the RF mixer 115 with the radio frequency carrier signal generated by the receiving frequency synthesizer 112 to generate the original frequency modulated signal. The frequency demodulator 116 extracts from the frequency modulated signal data messages, the SAT, the ST, and speech. In the message detector 117, the received messages are decoded according to the appropriate BCH code. If the coding indicates any bit errors, the microprocessor controller 102 is informed of such errors. A decoded message is detected in the message detector 107 and transmitted to the microprocessor controller 102. The speech processor 117 processes the voice signals from the frequency demodulator 116 to generate a voice output signal over a speaker 99. The speech processor 117 includes conventional de-emphasis and expansion stages. As mentioned above, the SAT signal is detected in the SAT detector 106 and transmitted to the microprocessor controller 102.

Figure 3B:
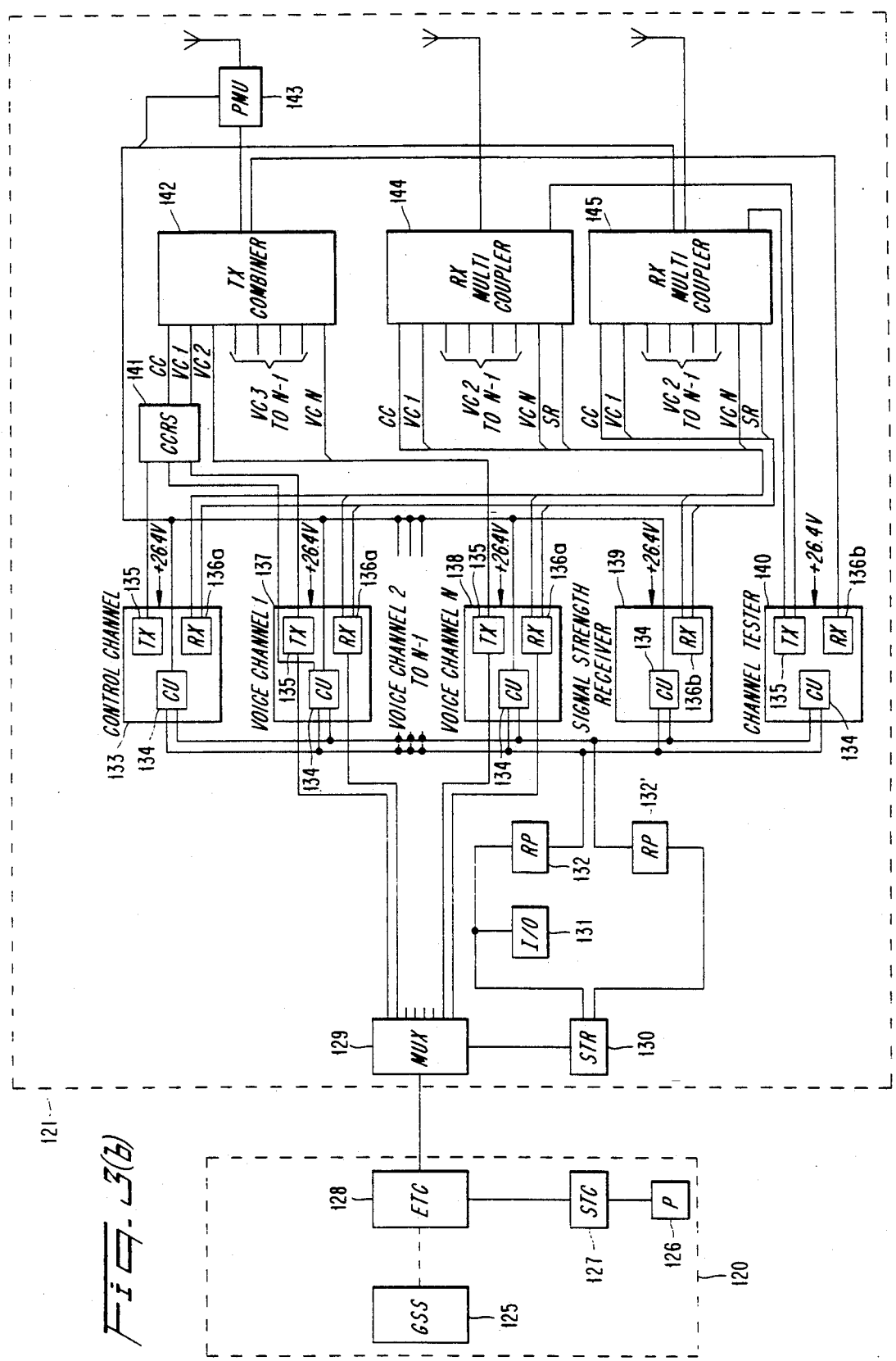
FIG. 3 is a block diagram illustrating an analog FDMA base station in a cellular mobile radio system according to FIG. 1.

An analog base station and mobile switching center to be used in conjunction with the above-described analog mobile station will now be described in conjunction with FIGS. 3(a) and 3(b). The function block diagram in FIG. 3(a) shows a mobile switching center 120 connected with at least one base station 121. Of course, it will be recognized by those skilled in the art that more than one base station is typically connected to the mobile switching center 120. In general, the base station 121 includes a radio switch interface 122 and a radio channel group 123. The base station 121 relays data and speech signals to the mobile stations and supervises the quality of radio transmissions using the supervisory audio tone (SAT) and by measuring the strength of signals received from the mobile stations.

The radio switch interface 122 functions as a medium to signal between the mobile switching center 120 and the base station 121. The radio switch interface 122 receives data from channel units in the radio channel group 123 and sends this data to the mobile switching center 120 on a dedicated MSC-BS data link. In the opposite direction, the radio switch interface 122 receives data from the mobile switching center 120 on the MSC-BS data link and sends this data to the appropriate channel units in the radio channel group 123. The radio switch interface 122 also receives and digitizes speech from the radio channel group 123 and sends it to the mobile switching center 120 over Pulse Code Modulation (PCM) channels and vice-versa.

The mobile switching center 120 and the base station 121 will now be described in more detail in conjunction with FIG. 3(b). The mobile switching center 120 includes a group switch subsystem 125 which connects voice communications from the public switching telephone network (PSTN) to the cellular network. A processor 126 generates the control messages necessary to coordinate the communication from the mobile switching center 120 to the base station 121. A control message from the mobile switching center 120 to a specific control unit 134 in the base station 121 is transmitted from the processor 126 to a central signalling terminal 127. The control message contains an address of a corresponding regional processor 132 which coordinates communication signals with individual control units 134. This address as well as the contents of the message are processed by the central signalling terminal 127 and sent to the exchange terminal circuit 128. The exchange terminal circuit 128 inserts the received information into a PCM signal format and transmits the pulse coded information over a PCM link to the multiplexor 129. A regional signalling terminal 130 receives the control message from the multiplexor 129 and ensures that it has not been corrupted during transmission using conventional error checking techniques. The regional signalling terminal 130 then transmits the control message to a regional processor 132. It should be noted that for fault tolerance purposes, a backup regional processor 132' has been shown in a redundant loop. Messages which may be originated by personnel at the base station 121 are connected with the mobile switching center 120 via an input/output interface 131. The regional processor 132 transforms parallel message data into a serial data stream and vice-versa. Individual control units 134, which may be, for example, conventional microprocessors, recognize their own address to retrieve the associated control message.

In addition to control messages communicated between the mobile switching center 120 and the base station 121, voice signals are communicated between the mobile switching center 120 and the base station 121 using a bi-directional voice transmission between one of multiple voice channels VC1 . . . VCN in the base station 121 and the group selection switch 125. The exchange terminal circuit 128 and the multiplexor 129 ensure that the data stream is directed to the appropriate channel during transmission and retrieved from the appropriate channel during reception. Voice signals received by a receiver 136a uplink from a mobile station are sent in analog form to the multiplexor 129 which converts the voice signals into digital form. The digitized voice data are transmitted over the appropriate pulse code modulation (PCM) channel (otherwise referred to as the associated time slot) to the mobile switching center 120, received by the exchange terminal circuit 128, and directed to the group switch 125.

In the downlink direction to the mobile station, the multiplexor 129 receives the digital speech data from the group switch 125 via the exchange terminal circuit 128 on the corresponding PCM channel. The data are converted to analog form and are directed to a dedicated transmitter 135 for radio frequency transmission over a particular voice channel. The channel units are assigned to operate as voice channel units 137 and 138, as a control channel unit 133, as a signal strength receiver 139, or as a channel &:ester 140.

A voice channel is selected and seized by the mobile switching center 120 during a call access procedure. When the conversation is finished, that channel is free for another conversation. Voice channel assignment is administered by the mobile switching center 120 which maintains a list of all the channels and their states (free, busy, blocked, etc.). When a voice channel becomes free, the transmitter 135 of that channel unit is switched off. When a voice channel is seized, the transmitter 135 is activated. Typically, there are between five and thirty voice channels in each cell.

Because there is normally only one control channel in each cell, a base station serving an omni-directional cell is equipped with one control channel unit 133. The control unit 134 of the control channel unit 133 supervises control messages between the mobile switching center 120 and the base station 121 as well as control-based radio signals between the base station 121 and the mobile stations, such as paging and access signals. The signal strength receiver 139 measures the strength of the signals received from mobile stations on any voice channel allocated to the associated cell as well as the neighboring cells. Voice channels are continuously scanned in sequence and samples of signal strength measurements are stored in the signal strength receiver control unit 134. These signal strength measurements are transmitted to the mobile switching center 120 when determining whether a call in progress is to be handed off to another cell. The channel tester 140 allows an operator to test the base station equipment.

A base station is unable to provide and, service (apart from the calls already set up) when its control channel is non-operational. In order to avoid such a situation, whenever a control channel becomes faulty, a voice channel designated as a backup channel takes over automatically in assuming the control channel functions. The mobile switching center 120 commands the backup channel to cease operation as a voice channel, and the transmitter output from that backup channel is switched by the control channel redundancy switch 141 to assume the non-operating control channel's position as the input to a transmitter combiner 142. The uplink control is also transferred to the backup channel, but this transfer requires no hardware switching. Similarly, another voice channel can be defined as backup for the signal strength receiver.

Because up to 16 transmitters may be connected to a common antenna, the transmitter combiner 142 provides the effect of having only one transmitter connected to the antenna at any given operating frequency. The receiver multicouplers 144 and 145 allow up to 48 channel receivers 136a and two signal strength receivers 136b to be connected to the same receiver antenna. The power monitoring unit 143 is connected at the transmitter combiner 142 output and supervises the forward and reflected power.

A conventional handoff in an analog FDMA system is executed as follows. A mobile station is connected to a serving base station. When the signal strength or quality in the serving base station from the mobile station decreases below a predetermined threshold, a handoff request is made from the base station to the mobile switching center. The mobile switching center orders the neighboring base stations to send the previously measured signal strength of the signal from the mobile station of interest, at the frequency over which the mobile station is communicating with the serving base station. The mobile switching center then compares the signal strength measurements made in the serving base station with those signal strength measurements made in the neighboring base stations. If a neighboring cell having a greater signal strength than the threshold is available, a handoff may be performed.

In neighbor-assisted handoff according to the present invention, a handoff may be requested or initiated not only by the serving base station but also by neighboring base stations. A neighboring base station is defined as any base station in the geographical vicinity of the serving base station that detects or can detect the signal strength of communications between the serving base station and one or more mobile stations being served by the serving base station. Thus, the cell of a neighboring base station may overlap, be adjacent to, or be separated some distance from the cell of the serving base station. A neighboring base station requests a handoff when the detected signal strength or quality of the uplink communication from the mobile station to the base station reaches a sufficient strength or quality level or when the path loss falls below a threshold value. These threshold levels may be set individually for each combination of serving base station/neighboring base station. Upon receipt of the handoff request, the mobile switching center determines whether a handoff should take place. The mobile switching center evaluates the measured signal parameters not only from the serving base station but also from all of the neighboring base stations.

The signal strength receiver 139 in each base station measures the strength of signals received from mobile stations in the home cell and in the neighboring cells on any radio voice channel allocated to those cells and determines whether a particular signal strength, path loss, or signal quality level beyond a threshold justifies initiating a handoff request. It should be noted that the criteria both for requesting and for deciding a handoff may include but are not limited to signal strength, path loss, signal quality (e.g., signal-to-noise ratio S/N, carrier-to-interference ratio C/I, or bit error rate BER), and, for digital channels, time dispersion. Such criteria are generally referred to herein as signal parameters. Only signal strength is referred to in the subsequent description for the sake of simplicity and brevity.

Detailed flow charts of software routines that may be used to implement neighbor-assisted handoff according to the present invention are set forth in FIGS. 4-6. In FIG. 4, a neighbor-assisted handoff routine followed by a serving base station to implement neighbor-assisted handoff is described. In step 200, the serving base station monitors the signal strength of mobile stations being served by the serving base station. At decision step 202, the serving base station determines the relationship of the monitored signal strength to a predetermined threshold value. If the signal strength exceeds a predetermined threshold, program control proceeds directly to decision step 208. If the monitored signal strength is less than the predetermined threshold, a handoff request is sent to the mobile switching center in step 206 provided X seconds have elapsed in step 204 since the previous handoff request for that same mobile station. The time period is set by the mobile switching center. If the time period of X seconds has not elapsed, program control proceeds to step 208. At decision step 208, the serving base station determines whether the mobile switching center has transmitted a handoff order and a new voice channel to the serving base station. If the handoff order and new channel are received by the serving base station, control proceeds to step 210 where the serving base station orders the mobile station to tune to the new channel. Otherwise, the control returns to step 200 to repeat the process.

A program routine that may be used by &:he neighboring base stations in neighbor-assisted handoff according to the present invention will now be described in conjunction with FIG. 5. Beginning at step 220, the signal strength control unit 139 in the neighboring base station detects the signal strength from neighboring mobile stations. At step 222, the neighboring base station determines whether the measured signal strength received from a particular neighboring mobile station is greater than or equal to a predetermined threshold value.

One important aspect of the present invention is that the threshold value may be specified according to the particular combination of the base station/cell performing the signal strength measurement and the base station/cell serving the mobile station. Accordingly, each base station may have as many variable threshold levels for signal strength (or other signal parameter) as it has neighboring base stations. Moreover, each threshold may be varied by the mobile switching center to change the size and shape of each corresponding cell. As a result, a lowered threshold value increases the size of a target cell and an increased threshold value decreases it with respect to mobile stations entering/leaving a cell due to handoff, whereas cell size with respect to mobile stations entering a cell because of a new call is not affected by the present invention.

If the detected signal is less than the threshold, the program control proceeds to step 230. If the detected signal exceeds or is equal to that predetermined threshold value, program control proceeds to decision step 226 where the neighboring base station sends a handoff request to the home mobile switching center via the serving mobile switching center in step 226 provided Y seconds have elapsed in step 224 since the previous handoff request for that same mobile station. The time period of Y seconds is set by the mobile switching center (MSC). If Y seconds have not elapsed, program control proceeds to step 230. Of course, if both base stations are supervised by the same mobile switching center, the handoff request is sent directly by the neighboring base station to the mobile switching center. At step 228, the neighboring base station sends signal strength measurements to the mobile switching center for sorting in order of greatest to least strength. In decision step 230, the neighboring base station monitors whether the mobile switching center has selected that neighboring base station as the target handoff station. If the mobile switching center determines that a handoff should be performed by this neighboring station, that neighboring base station receives instructions to take over the mobile station connection from the serving base station in step 232. Otherwise, program control returns to step 220 to repeat the process.

Although the neighboring base station may in fact be able to provide a better connection for the mobile station, the ultimate decision to perform a handoff rests with the mobile switching center. The neighboring base station simply makes the mobile switching center aware that it is available to provide a call connection with the mobile station having sufficient strength. The mobile switching center may select any neighboring base station after having collected signal strength information from each neighbor or it may choose not to initiate a handoff at all. If a cell is already at capacity, it has no available channels. Nonetheless, it is still desirable for the mobile switching center to maintain a signal strength report in the event that a current call connection is handed off making room for a new, stronger signal connection.

A program control routine that may be followed by the mobile switching center in order to implement neighbor-assisted handoff according to the present invention will now be described in conjunction with FIGS. 6(a)-6(b). At step 250, the mobile switching center monitors handoff requests from serving and neighboring base stations. In conjunction with step 252, the mobile switching center reviews the signal strength signals detected by the signal strength control units 139 in the serving base station and in the neighboring base stations which are related to mobile stations with handoff requests. Program control proceeds to step 254, where the mobile switching center orders the signal strength values received from both the serving and neighboring base stations in the order of greatest to weakest signal strength. In step 256, the mobile switching center selects the base station having the greatest signal strength.

Once the optimum base station has been selected, the mobile switching center determines in decision block 257 whether the selected base station has an available radio channel. If no radio channel is available, the mobile switching center selects the base station with the next greater signal strength value. This process is repeated in step 258 until a base station having an available channel and an acceptable signal strength value is obtained. If the selected base station does have an available radio channel, program control proceeds to step 260 where the mobile switching center determines whether the selected base station is supervised by another mobile switching center. If so, that serving mobile switching center is requested to order a handoff from the serving base station to the selected base station in step 262. At step 264, the appropriate mobile switching center orders the mobile station and the serving base station to cease communication and orders the mobile station and selected base station to commence communication over a selected radio channel.

While neighbor-assisted handoff has been described in the context of analog channels, it may be readily applied to digital channels in purely digital systems or dual mode systems. For example, in a TDMA system, a neighboring base station measures the signal strength of the uplink time slot assigned to that mobile station as opposed to any time on a FDMA uplink frequency assigned to a mobile station. The procedure for measuring signal strength on TDMA traffic channels is disclosed in U.S. patent application No. 07/371,126 entitled "Mobile-assisted Handoff," referenced above.

The neighbor-assisted handoff procedure according to the present invention may be utilized in a variety of applications to improve the quality and flexibility of service of cellular telephone systems. Several of these applications will be described below.

While cellular telephone systems typically have similarly sized cells, some cellular systems may include cells of different sizes and shapes. For example, high traffic density areas may be covered by a number of smaller cells within a large umbrella cell. The use of smaller cells in these high traffic density areas allows more frequent channel reuse, thereby increasing traffic capacity These small cells are often characterized as microcells and may be created by positioning base station antennas at lamp post level rather than on top of large building structures, for example. Larger umbrella cells or macrocells will be used to take care of any holes in coverage in the microcell structure.

In order to make optimal use of the microcells, as much traffic as possible should be guided to a microcell rather than to the macrocell. This is true even if the macrocell can provide an acceptable call connection. As mentioned in the background, traditional handoff systems fail to take full advantage of the microcells. An example of how neighbor-assisted handoff fully exploits the macrocell/microcell structure will be described in conjunction with FIGS. 7 and 8.

Figure 7:
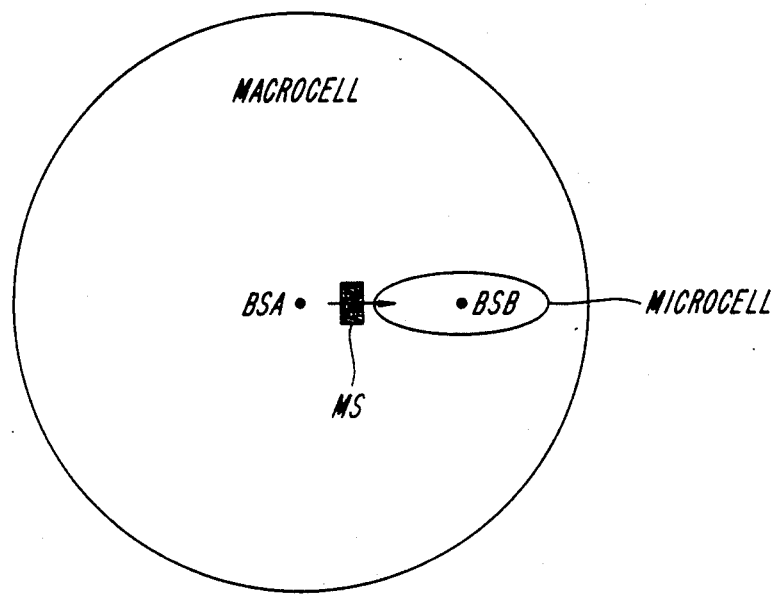
FIG. 7 illustrates a macrocell umbrella which includes a microcell.
Figure 8:
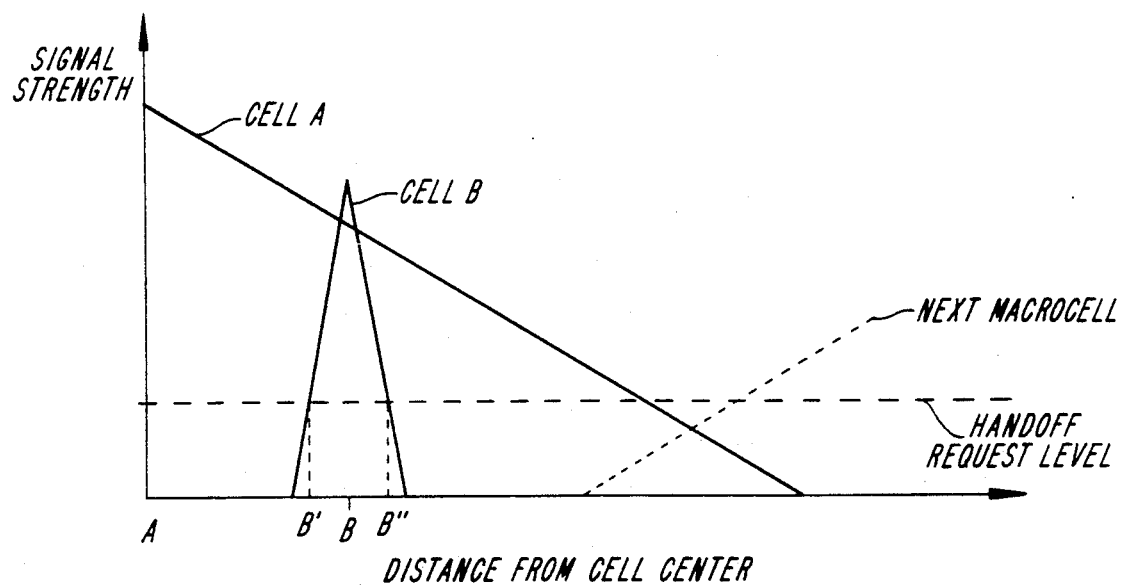
FIG. 8 is a graph showing the signal strength received by the base stations in FIG. 7 as a function of distance from the cell center of the macrocell.

Referring now to FIG. 7, a mobile station served by the macrocell base station BSA moves into an area that is also covered by the microcell base station BSB. In FIG. 8, the signal strength received by the two base stations A and B are plotted as a function of the cell radius of the macrocell. At certain points between B' and B'', the signal strength measured in the base station B is greater than a handoff threshold. However, because the microcell is situated near base station A, it is highly unlikely that the signal strength received in the base station A from the mobile station will be sufficiently low for base station A to generate a traditional handoff request. A majority of the traffic will remain at the macrocell level even though the microcell provides sufficient signal strength. As a result, the microcell is under utilized.

In contrast to traditional handoff techniques, the neighbor-assisted handoff system according to the present invention takes full advantage of microcells within umbrella macrocells. Referring again to FIGS. 7 and 8, when base station B, a neighboring base station to base station A, determines that the signal strength received from the mobile station exceeds a predefined threshold between B' and B'', the neighbor base station B makes a handoff request to the mobile switching center. The mobile switching center compares the signal strength values measured in the umbrella cell and its neighbors and determines that the base station B is the optimum choice in terms of sufficient signal strength and quality and in terms of balancing the load between the macrocell and its microcells.

Figure 9:
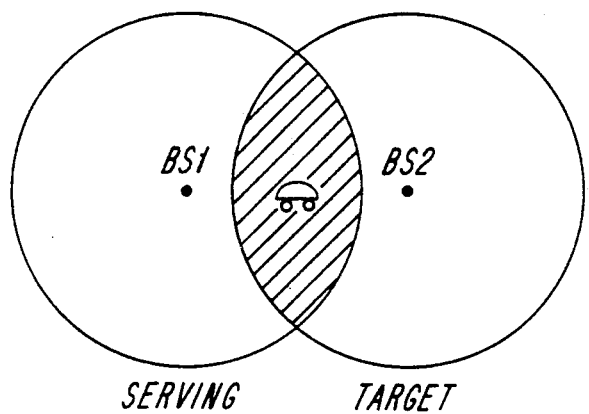
FIGS. 9–11 illustrate various overlapping cell structures.

Neighbor-assisted handoff also improves call connection quality and load sharing. In a high traffic density area, it is difficult to direct traffic between cells in order to obtain improved, overall communication quality. Traditionally, cellular traffic is only, handed off to neighboring cells when the signal quality has deteriorated in the serving cell to a non-acceptable level. One way to relieve congestion and poor quality is to only allow a congested cell to carry calls that have no other sufficient coverage in other cells. However, because of the large cell overlap in radio coverage in cellular systems, alternative cells beside the serving base station often can handle mobile station calls as described above with regard to the macro/microcell example. Thus, a cellular system implementing the neighbor-assisted handoff technique according to the present invention provides the mobile switching center with the information necessary to determine from a network point of view the optimal cell for a call connection. As a result, neighbor-assisted handoff may be used to optimize radio signal quality and/or to relieve a highly congested cell by distributing the traffic load between the cells. Thus, while the mobile station in FIG. 9 may be handled either by a serving base station BS1 or a target base station BS2, the mobile switching center may determine which of these two base stations is best suited to handle this call connection given the traffic demands on both base stations and the quality of the call connection either of these two base stations is capable of delivering.

Figure 10:
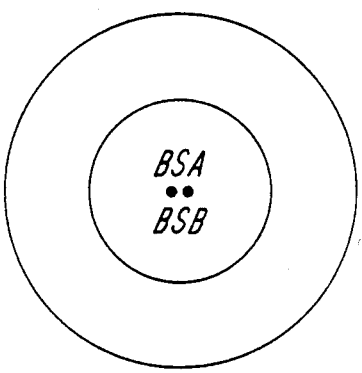
Figure 11:
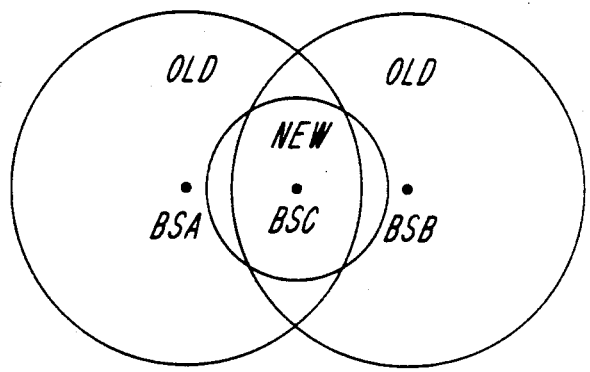

Neighbor-assisted handoff may also be used to enhance the flexibility of cell planning. In a macro/microcell environment, the microcell often has overlapping or completely redundant radio coverage with the macrocell. This overlapping or redundant coverage may of course be necessary in order to increase traffic capacity Two possible overlapping coverage areas are shown in FIG. 10 (fully redundant) and in FIG. 11 (overlapping). In those heavy traffic areas corresponding to the microcells, the mobile switching center utilizes neighbor-assisted handoff in order to direct traffic to these new microcells even though the old macrocells could handle that traffic.

Another application for neighbor-assisted handoff is in the area of priority subscription. In priority subscription, different sets of subscribers are assigned a priority factor. Those groups with a higher priority have a higher probability of obtaining a radio channel at both call setup and call handoff. The highest priority group would always be entitled to receive a radio channel even at the expense of dropping a no priority or low priority call in a congested cell. Using neighbor-assisted handoff, these no priority or low priority calls would not need to be dropped per se. Rather, the mobile switching center would redirect these calls to other cells which have reported that they have sufficient signal strength or signal quality to support a handoff.

Although the present invention has been described in the context of analog mobile stations, neighbor-assisted handoff may be used to provide a back-up, supplemental handoff procedure for disrupted call connections involving digital channels and mobile-assisted handoff (MAHO).

The expression "base station" should not only be interpreted as a single unit in a base site serving an associated geographical area. The "base station" could also be a number of transceiver modules, a group of transceiver modules serving several geographical areas and a so-called "remote controller" which controls the operation of the modules, as e.g., the base station controller (BSC) in the GSM system. The handoff request can then be originated from this remote controller or from a transceiver module.

From the foregoing description of the specific embodiments others can, by applying current knowledge, readily modify and/or adapt for various applications such specific embodiments without departing from the general nature of the invention, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A cellular mobile radio telephone system, comprising:
    a plurality of base stations assigned to corresponding geographical areas in said cellular system, each of said base stations including:
    means for monitoring signal connection parameters between mobile stations and itself;
    means for requesting a handoff of an associated mobile station currently being served by itself when one of said monitored signal parameters fails to satisfy a first variable predetermined threshold; and
    means for requesting a handoff for a neighboring mobile station currently being served by another base station when one of said monitored signal parameters satisfies a second variable, predetermined threshold; and
    a mobile switching center for coordinating communications between said mobile stations and said plurality of base stations including:
    means for receiving said handoff requests from said base stations serving mobile stations and said handoff requests from base stations serving said neighboring mobile stations, and
    means for determining whether to execute handoffs based on said signal parameters received from said serving base stations and from said base stations serving said neighboring mobile stations.

2. The system according to claim 1, wherein said signal parameters include at least one signal strength and signal quality.

3. The system according to claim 1, wherein said means for determining includes:
    means for sorting said base stations in accordance with a magnitude of said monitored signal parameter associated with each of said base stations, and
    means for selecting a base station as a preferred handoff base station that has the most optimal magnitude of said monitored signal parameter.

4. The system according to claim 3, wherein said mobile switching center further comprises:
    means for determining if a communications channel from said selected base station is available;
    means for seizing said available communications channel; and
    means for selecting another base station having the next optimal of said monitored parameter magnitudes if said base station having the most optimal of said monitored parameter magnitudes has no available communications channels.

5. The system according to claim 1, wherein said mobile switching center includes:
    means for balancing mobile station communications traffic among said plurality of base stations by handing off call connections associated with serving base stations having higher traffic patterns to neighboring base stations having lower traffic patterns that have initiated a call handoff.

6. The system according to claim 1, wherein said mobile stations are assigned a priority and said mobile switching center includes:
    means for granting call connections for mobile stations having higher priority in heavy traffic areas, and
    means for handing off call connections of lower priority mobile stations in said heavy traffic areas to neighboring base stations in lower traffic areas.

7. The system according to claim 1, wherein said cellular system includes a plurality of differently sized, geographic areas, each area being associated with a corresponding base station and overlapping with others of said areas, said mobile switching center including:
    means for handing off mobile stations being served by base stations having large areas to neighboring base stations in smaller areas that overlap said larger areas.

8. The system according to claim 1, wherein said mobile switching center varies said variable, predetermined threshold of each base station to alter the size of said geographical area corresponding to each base station.

9. The system according to claim 1, wherein said signal connection is associated with an analog radio channel.

10. The system according to claim 1, wherein said signal connection is associated with a digital radio channel.

11. A cellular mobile telephone system having a plurality of differently-shaped, overlapping geographic cells, comprising:
    first means within each cell for detecting a signal parameter of call connections currently being served by each cell and for requesting a transfer of one or more call connections based on said detected signal parameter;
    second means within each cell for detecting said signal parameter of call connections associated with neighboring cells and for requesting a transfer of one or more call connections based on said detected signal parameter; and load balancing means for balancing a number of call connections associated with each cell including:

means for receiving from said first means and second means said signal parameters of call connections associated with said serving cells and said neighboring cells, respectively;

means responsive to transfer requests from said first and second means, for transferring call connections to neighboring cells based on said detected signal parameter and the number of unoccupied channels in each cell.

12. The system according to claim 11, wherein said differently-sized cells include large cells that overlap small cells and said transferring means transfers call connections from a large cell to an overlapped, smaller cell when said detected signal parameter from said smaller cell exceeds a predetermined threshold.

13. The system according to claim 11, wherein said signal parameters include signal strength and signal quality.

14. The system according to claim 11, wherein each cell includes:

means for requesting said load balancing means to transfer a currently served call connection to a neighboring cell.

15. The system according to claim 12, wherein each cell has at least one variable, predetermined threshold and said load balancing means varies the size and shape of at least one cell by changing said at least one variable, predetermined threshold corresponding to said at least one cell.

16. In a cellular mobile radio telephone system having a centralized switching center, a method for handing off call connections between mobile stations and serving base stations, comprising:

detecting from neighboring base stations handoff requests and at least one signal parameter of a call connection between a mobile station and an associated, serving base station;

determining a preferred, neighboring base station for handoff based on said at least one detected signal parameter from said neighboring base stations; and executing a handoff of said call connection from said serving base station to said preferred neighboring base station.

17. The method according to claim 16, wherein said determining step further includes:

sequentially ordering said neighboring base stations based on their corresponding detected signal parameter values, and selecting said preferred base station having the most optimal corresponding signal parameter value.

18. The method according to claim 16, wherein said signal parameter includes signal strength and signal quality.

19. The method according to claim 16, further comprising:

balancing a number of call connections associated with each base station by executing handoffs of call connections associated with congested serving base stations to neighboring base stations which are not congested and which have a detected call connection signal parameter that satisfies a variable predetermined criterion.

20. The method according to claim 19, wherein said balancing step further comprises:

altering said variable, predetermined criterion.

21. The method according to claim 16, further comprising:

prioritizing subscribers to said cellular system;

granting call connections in high traffic areas to higher priority subscribers; and handing off call connections of lower priority subscribers from said high traffic areas to lower traffic areas in response to call connections granted to said higher priority subscribers.

22. The method according to claim 16, wherein each pair of neighboring base station and serving base station has at least one associated threshold, and handoffs are executed based on comparisons of said detected signal parameter to associated thresholds.

23. The method according to claims 22, further comprising:

varying said at least one associated threshold of said pairs of neighboring and serving base stations.

* * * * *